(12) United States Patent
Zanfir et al.

(10) Patent No.: US 11,110,424 B2
(45) Date of Patent: Sep. 7, 2021

(54) REFORMER BOX WITH REFORMER TUNNEL INCLUDING TUNNEL PORT

(71) Applicants: Monica Zanfir, The Woodlands, TX (US); Bo Jin, Orefield, PA (US); Minish Mahendra Shah, E. Amherst, NY (US)

(72) Inventors: Monica Zanfir, The Woodlands, TX (US); Bo Jin, Orefield, PA (US); Minish Mahendra Shah, E. Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 16/686,325

(22) Filed: Nov. 18, 2019

(65) Prior Publication Data

US 2021/0148656 A1   May 20, 2021

(51) Int. Cl.
*B01J 8/06* (2006.01)
*F28F 9/013* (2006.01)
*F28F 9/02* (2006.01)

(52) U.S. Cl.
CPC .............. *B01J 8/062* (2013.01); *B01J 8/067* (2013.01); *F28F 9/013* (2013.01); *F28F 9/0263* (2013.01); *B01J 2208/00504* (2013.01); *B01J 2208/065* (2013.01)

(58) Field of Classification Search
CPC ...... B01J 8/062; B01J 8/068; B01J 2208/065; B01J 2208/00504
See application file for complete search history.

(56) References Cited

U.S. PATENT DOCUMENTS

| 5,935,532 | A | 8/1999 | Shida et al. |
| 5,945,074 | A | 8/1999 | Waterreus et al. |
| 7,504,048 | B2 | 3/2009 | Licht |
| 10,458,707 | B2 * | 10/2019 | Barnett ............... F27D 1/003 |
| 2007/0234974 | A1 | 10/2007 | Tacker |
| 2014/0314631 | A1 | 10/2014 | Meissner et al. |

FOREIGN PATENT DOCUMENTS

| CN | 110026133 A | 7/2019 |
| DE | 202015105493 U1 | 12/2015 |
| DE | 202015105494 U1 | 12/2015 |
| EP | 2708812 A1 | 3/2014 |
| GB | 1037094 | 7/1966 |
| WO | 2005/018793 A1 | 3/2005 |
| WO | 2013/182392 A1 | 12/2013 |
| WO | 2018/119172 A1 | 6/2018 |

OTHER PUBLICATIONS

A. K. Majumdar, "Mathematical modeling of flows in dividing and combining flow manifold" (1980) Appl. Mth. Modeling, vol. 4.

* cited by examiner

*Primary Examiner* — Lessanework Seifu
(74) *Attorney, Agent, or Firm* — Iurie A. Schwartz (57) ABSTRACT

A top-fired reformer box is provided. The top-fired reformer box includes a burner row, a tube row, a reformer tunnel including a closed end, an open end, and a plurality of tunnel ports formed along a side wall of the reformer tunnel, the plurality of tunnel ports including a one or more tunnel port located along the side of the tunnel, and a flow resistor positioned at least one tunnel port applying a flow resistance for flue gas entering the reformer tunnel via the at least one tunnel port such that uniform flow is achieved within the reformer tunnel.

14 Claims, 13 Drawing Sheets

REFORMER BOX WITH REFORMER TUNNEL INCLUDING TUNNEL PORT

TECHNICAL FIELD

The present disclosure relates generally to a reformer box with reformer tunnels that receive flue gas.

BACKGROUND

In a typical reformer box, a set of reformer tunnels are configured to collect flue gas. However, the flue gas is usually not evenly distributed throughout the reformer tunnel, resulting in undesirable heating of the components of the reformer box. Furthermore, the flue gas downward velocity increases significantly when the flue gas enters the region between neighboring tunnels, thereby creating undesirable hot spots within the reformer box.

Figure 1:
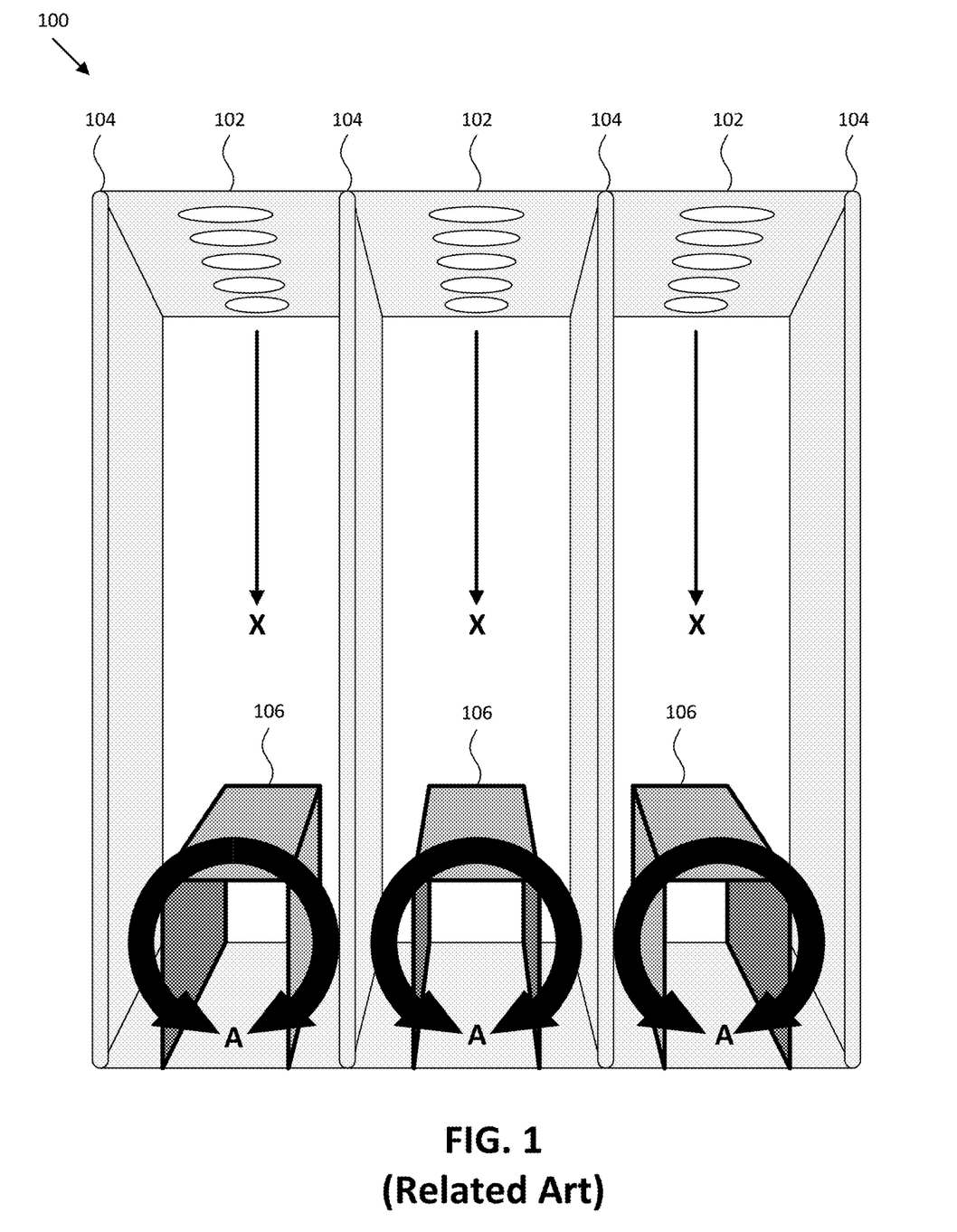
FIG. 1 is a diagram of a top-fired reformer box.

FIG. 1 is a diagram of a top-fired reformer box 100. The reformer box 100 includes burner rows 102, tube rows 104 and tunnels 106. In a typical top-fired reformer box, a set of reformer tunnels 106 are built on and above the floor to collect flue gas (i.e. products of the combustion of fuel and air entering the box through a set of burners). The burners may be arranged in rows on the ceiling of the box and one tunnel 106 is located directly under each burner row 102. The reformer tube rows 104 are arranged between the tunnels 106. The tunnels 106 may have a rectangular cross-sectional shape and tunnel ports are located on the tunnel side walls through which flue gas enters each tunnel 106. The tunnel length is bounded by two ends, with one end closed and the other end open.

As shown in FIG. 1, the flue gas flows down along direction X and moves around the tunnels 106 along direction A, entering the tunnels 106 via the ports in the side walls. It is desirable that the flue gas enters the tunnels 106 uniformly along the entire tunnel length. However, this distribution property is not easily achieved, since it is known from the theory of flow manifold that more flue gas enters the tunnels 106 near the open end rather than the closed end. This maldistribution of flue gas inside the reformer box 100 can lead to non-uniformity of heating among the reformer tubes 104 as well as the catalyst within, shortening reformer tube life and causing premature failure.

Furthermore, the average flue gas downward velocity increases significantly when the flue gas enters the region between neighboring tunnels. This is due to the tunnels 106 occupying a significant portion of the space for the flue gas to flow downward. High downward velocity enhances the convective heat transfer on the tubes 104 and thereby causes hot spots on the tubes 104, particularly near the tunnel roof. Such hot spots can significantly reduce the life of the tube.

Figure 2:
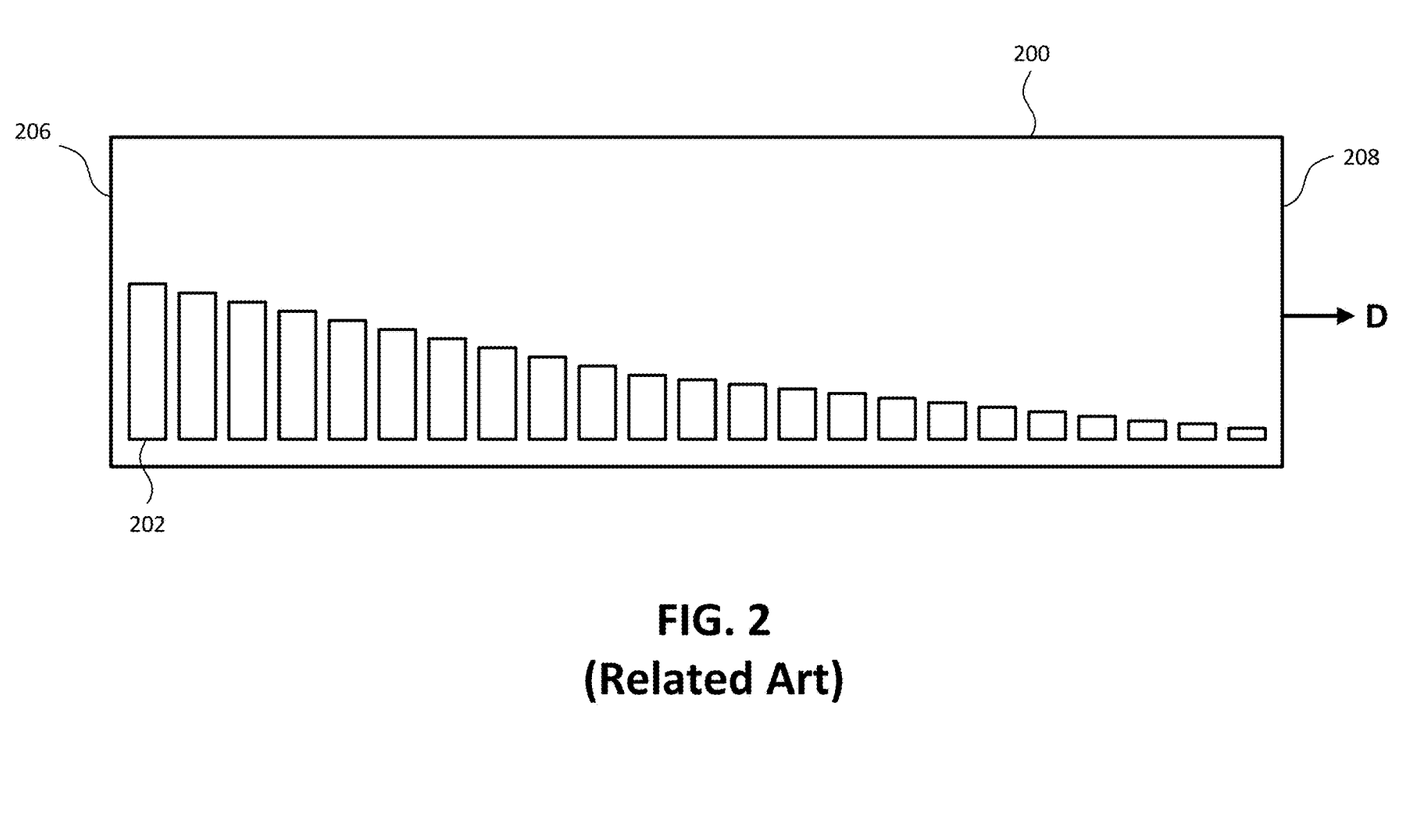
FIG. 2 is a side view of a reformer tunnel.

FIG. 2 is a side view of a reformer tunnel 200. Flue gas flows in the direction D. The reformer tunnel 200 includes a plurality of tunnel ports 202 formed along the side walls of the tunnel 200, as well as a closed end 206 and an open end 208. The tunnel ports 202 are of non-uniform size, with a larger tunnel port positioned near the closed end 206 of the tunnel 200, and a smaller tunnel port positioned near the open end 208 of the tunnel 200. In the example depicted, the tunnel ports 202 gradually decrease in size from the closed end 206 of the tunnel 200 to the open end 208 of the tunnel 200. Other size arrangements for the tunnel ports 202 such that a larger port is positioned near the closed end 206 and a smaller port is positioned near the open end 208 will be understood by those of skill in the art from the disclosure herein.

Figure 3:
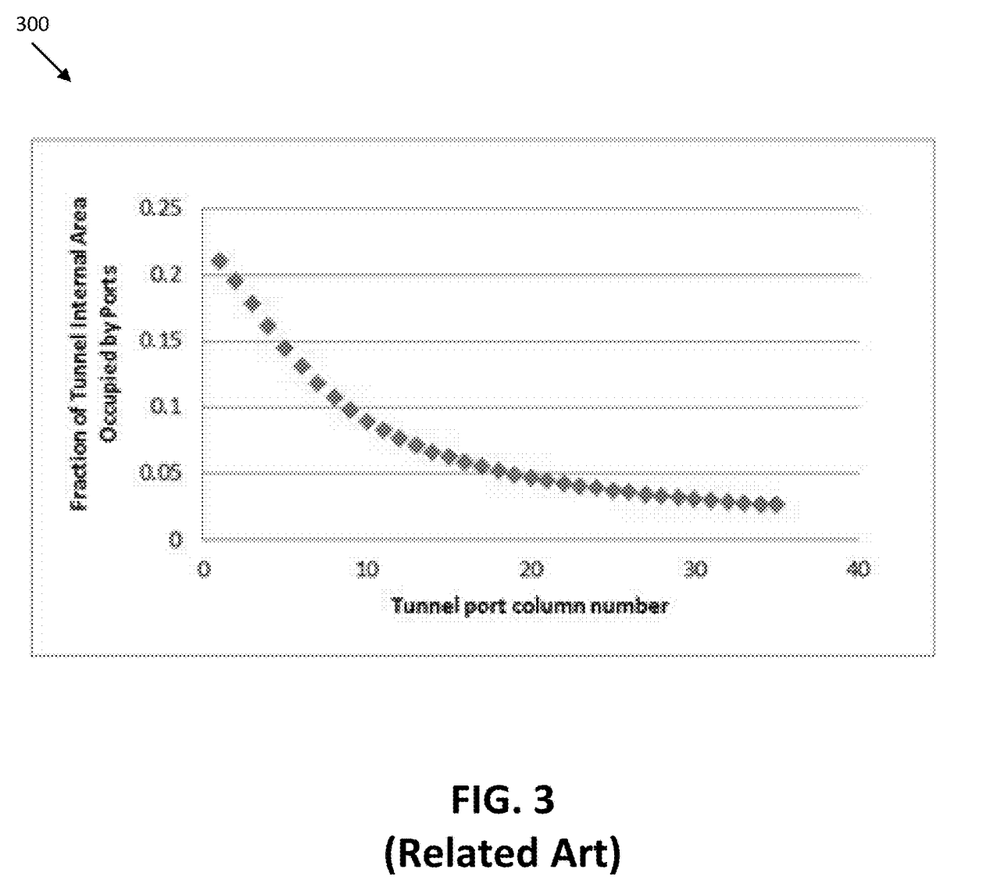
FIG. 3 is a graph depicting variation of tunnel port openings.

FIG. 3 is a graph 300 depicting variation in the tunnel port openings position. Tunnel port 1 corresponds to the tunnel port near the closed end 206 of the tunnel 200, and tunnel port 35 corresponds to the tunnel port near the open end 208 of the tunnel 200. FIG. 3 shows how the port openings area should change to enable uniform flow distribution (i.e., equal flow rate through all the ports).

It is known that more flow enters the tunnel near its open end than the closed end if the port openings are uniformly distributed along the side walls of tunnel having constant cross-section, as shown in U.S. Pat. No. 5,945,074. To achieve uniform distribution of flue gas entering a tunnel with a uniform rectangular cross-sectional shape, the group of port openings located on both side walls of the tunnel may have a gradually reduced number of openings in the direction towards the open end of the tunnel, as shown in U.S. Pat. No. 5,935,532. It is difficult to determine how to reduce the number of openings along the tunnel length and therefore, biasing of gas continues to be difficult to effectively prevent as shown in U.S. Pat. No. 5,935,532. A tunnel with one or two rows of uniformly distributed openings located at constant heights on both side walls along the length of each tunnel has been utilized. The tunnel roof was arranged such that tunnel cross-section area increases gradually toward its open end as shown in U.S. Pat. No. 5,935,532. It has been proposed to place a plurality of flow bodies like baffles inside a rectangular cross-sectional tunnel having openings on the tunnel side walls, and the flow baffles are arranged in a step-like fashion, with the steps leading downward to the tunnel open end, as shown in U.S. Pat. No. 5,945,074. It has been proposed that the majority of reformer tunnels are built outside the reformer box and the tunnel top cover is around the floor of the box through which the flue gas enters the tunnel, as shown in U.S. Publication No. 2007/0234974. These flue gas inlets through the tunnel top cover can have an angle toward the tunnel. The flue gas inlets toward the tunnel can vary its total opening area along the tunnel length.

SUMMARY OF THE INVENTION

The present disclosure has been made to address at least the disadvantages described above and to provide at least the advantages described below.

According to one embodiment, a top-fired reformer box is provided. The top-fired reformer box includes a burner row, a tube row, a reformer tunnel including a closed end, an open end, and a plurality of tunnel ports formed along a side wall of the reformer tunnel, the plurality of tunnel ports including a one or more tunnel port located along the side of the tunnel, and a flow resistor positioned at least one tunnel port applying a flow resistance for flue gas entering the reformer tunnel via the at least one tunnel port such that uniform flow is achieved within the reformer tunnel.

According to one embodiment, a top-fired reformer box is provided. The reformer box may include a burner row, a tube row, and a reformer tunnel including a closed end, an open end, a side wall and a roof. A plurality of tunnel ports is formed along the side wall of the reformer tunnel, and a plurality of tunnel ports is disposed in the roof of the reformer tunnel such that uniform flow is achieved within the reformer tunnel.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly, indirectly, or via a third element.

To improve the design depicted in FIG. 2 and plotted in FIG. 3, as well as that of the related art, a flow resistor may be placed inside each tunnel port, with the flow resistance increasing along the tunnel length. The flow resistance for each port can be quantified according to manifold theory to achieve the uniformity of flue gas entering the tunnel. To further improve the design depicted in FIG. 2 and charted in FIG. 3, tunnel ports may be formed along the roof of the tunnel in a single row or multiple rows, as will be described below.

Figure 4:
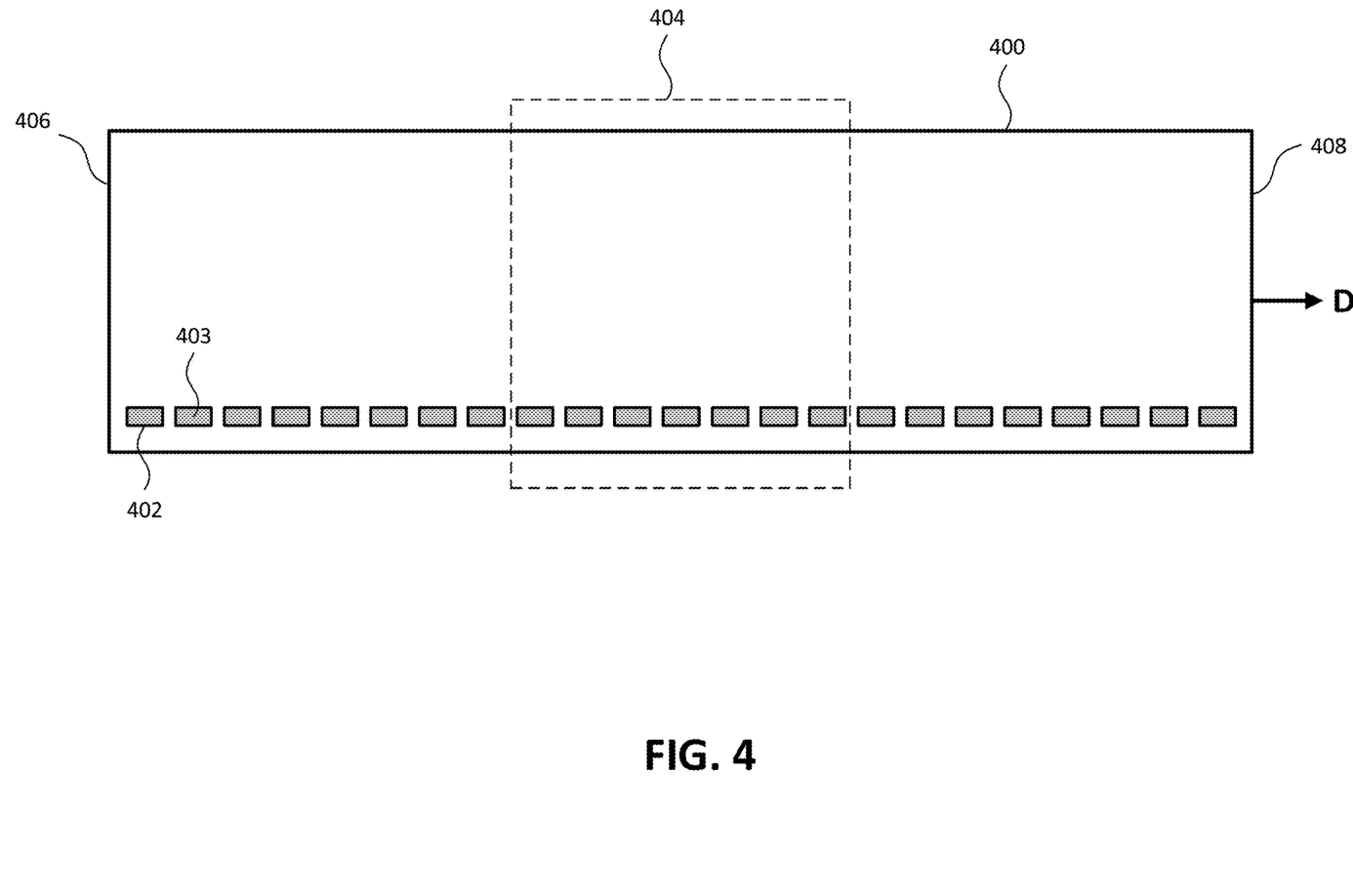
FIG. 4 is a side view of a reformer tunnel, according to an embodiment.
Figure 5:
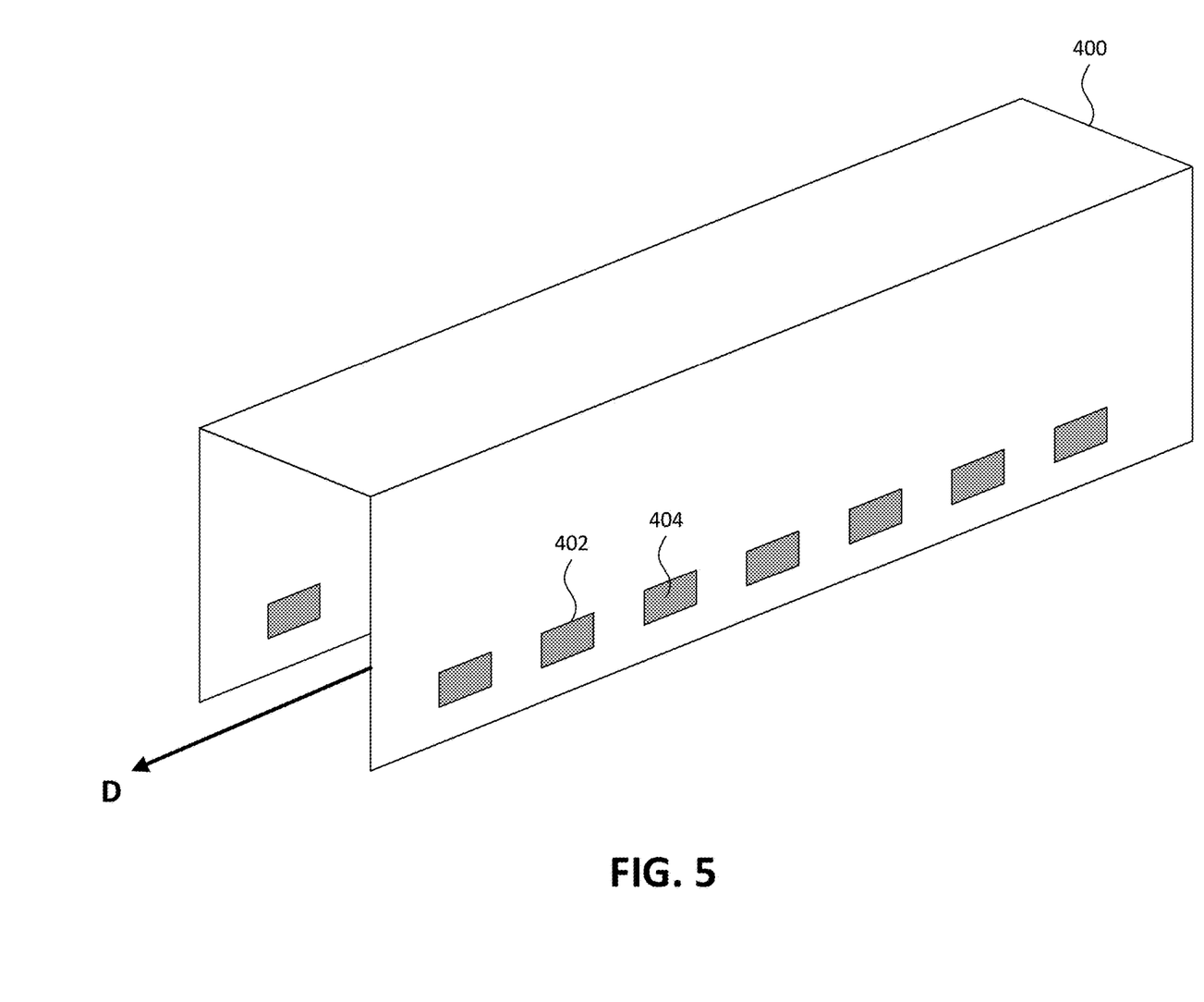
FIG. 5 is an isometric view of a portion of the reformer tunnel, according to an embodiment.

FIG. 4 is a side view of a reformer tunnel 400, according to an embodiment. FIG. 5 is an isometric view of a portion 404 of the reformer tunnel 400, according to an embodiment. Flue gas flows in the direction D. The reformer tunnel 400 includes a plurality of uniform sized ports 402 formed along the side walls of the tunnel 400, as well as a closed end 406 and an open end 408. A flow resistor 403 is positioned at each of the tunnel ports 402, each of which applies a flow resistance for flue gas entering the tunnel 400 via the tunnel ports 402 such that an amount of flue gas entering the tunnel 400 via the tunnel ports 402 is reduced based on the flow resistance of each flow resistor 403. Therefore, each tunnel port 402 may have a different flow resistance even when the size and shape of the tunnel ports 402 are uniform.

The flow resistors 403 may include perforated plates (which control the effective open area of the tunnel ports 402), porous media/baffles (which increase the resistance of flow through the tunnel ports 402), as well as other flow resistors that will be apparent to those of skill in the art from the disclosure herein. A flow resistor 403 can be any component, which can restrict to a certain degree the flue gas flow when placed in a tunnel opening due to its shape and design. At its simplest as noted above, the flow resistor 403 can be a precision perforated plate, a porous medium like a metallic foam and/or a ceramic porous material. More sophisticated devices may include any other inserts such as twisted-tape, wire coil, mesh inserts, brush inserts, packed bed structures including beads or pellets of variable size and shape. The flow resistors 403 may be configured such that the value of the flow resistance may increase along the tunnel length. Thus, the flow resistance may be lowest toward the closed end 406 of the tunnel 400 and the flow resistance may be highest toward the open end 408 of the tunnel 400. The flow resistance for each port 402 may be quantified according to the theory of manifold to achieve uniformity of flue gas entering the tunnel 400, and therefore achieve uniformity of heating. Furthermore, as less flow resistance against the flue gas entering the tunnel 400 is preferred near the closed end 406, flow resistors may be omitted from tunnel ports that are located closer to the closed end 406 of the tunnel 400.

Figure 6:
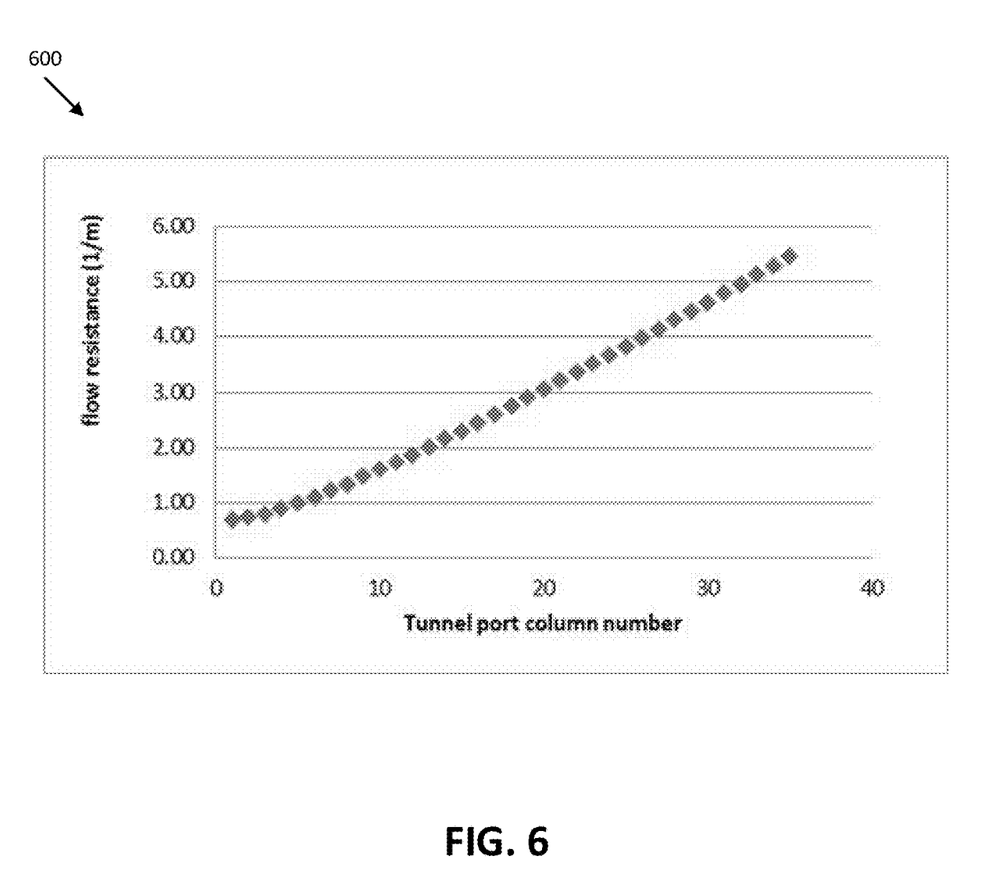
FIG. 6 is a graph of flow resistance variation, according to an embodiment.

FIG. 6 is a graph 600 of flow resistance variation, according to an embodiment. The graph 600 shows the variation of flow resistance based on tunnel port column number, where the closed end 406 of the tunnel 400 is near tunnel port 1, and the open end 408 of the tunnel 400 is near tunnel port 35. The flow resistance is defined as the ratio of pressure drop over half of the flow kinetic energy, and the flow resistance associated with each tunnel port is required to obtain a uniform flowrate through all ports.

Figure 7:
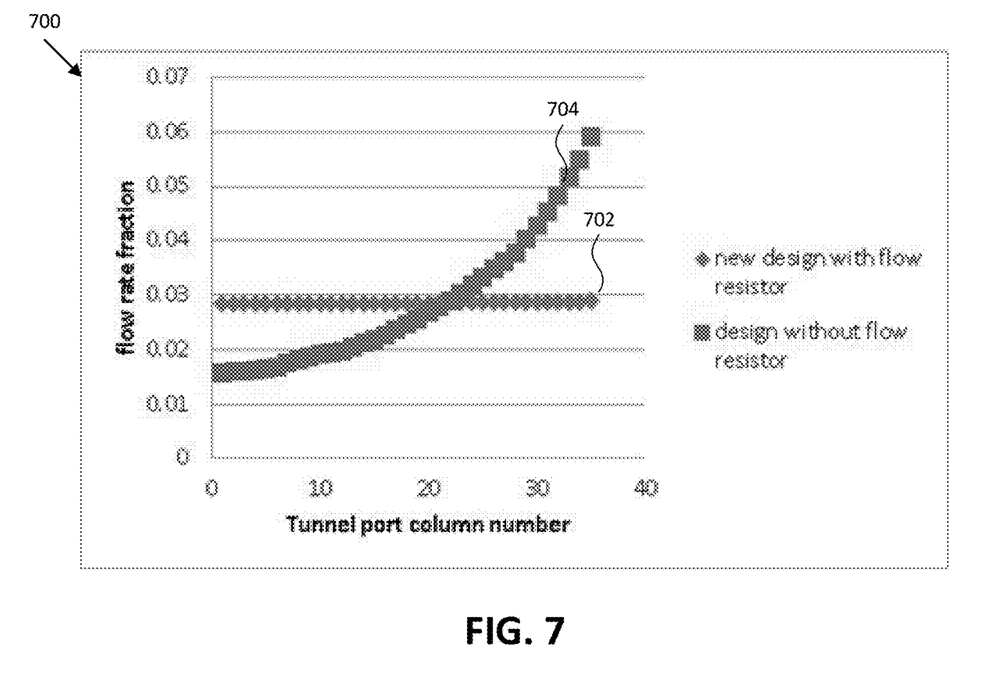
FIG. 7 is a graph of flue gas flow distribution as measured with respect to the reformer tunnel depicted in FIGS. 4 and 5, according to an embodiment.

FIG. 7 is a graph 700 of flue gas flow distribution as measured with respect to the reformer tunnel 400 depicted in FIGS. 4 and 5, according to an embodiment. In a particular example, reformer tunnels with 35 tunnel ports formed on each side wall, as well as 70 tunnel ports in two rows on the tunnel roof, were utilized. The cross-section of the tunnel ports on the tunnel side are the same as the cross section of the tunnel ports on the roof. A row of burners having 12 burners and two rows of reformer tubes having 48 tubes at each row are included in this example.

In FIG. 7, the flue gas flow distribution along the tunnel length is shown for a design with flow resistors 702 and without flow resistors 704. The tunnel design using flow resistors can achieve a uniform flue gas distribution along the tunnel length. For the same radiant efficiency, the maximum temperature of the reformer tube is 1660° F. with the tunnel design having the flow resistors, compared to 1700 F for the conventional design (ports with equal open area on the tunnel sides), where the flow distribution along the tunnel is represented by the line 702 in FIG. 7. The maximum temperature is located near the tunnel top or the reformer box. There is about 53% flow entering the tunnel through ports on the tunnel roof, which leads to a much smoother transition of downward flue gas velocity entering the tunnel region.

The examples described above achieve uniformity of heating (e.g., tunnel 400) and uniformity of downward flue gas velocity (e.g., tunnel 400). However, multiple configurations of tunnels may be implemented to better achieve uniformity of heating and/or uniformity of downward flue gas velocity, as is described below.

Figure 8:
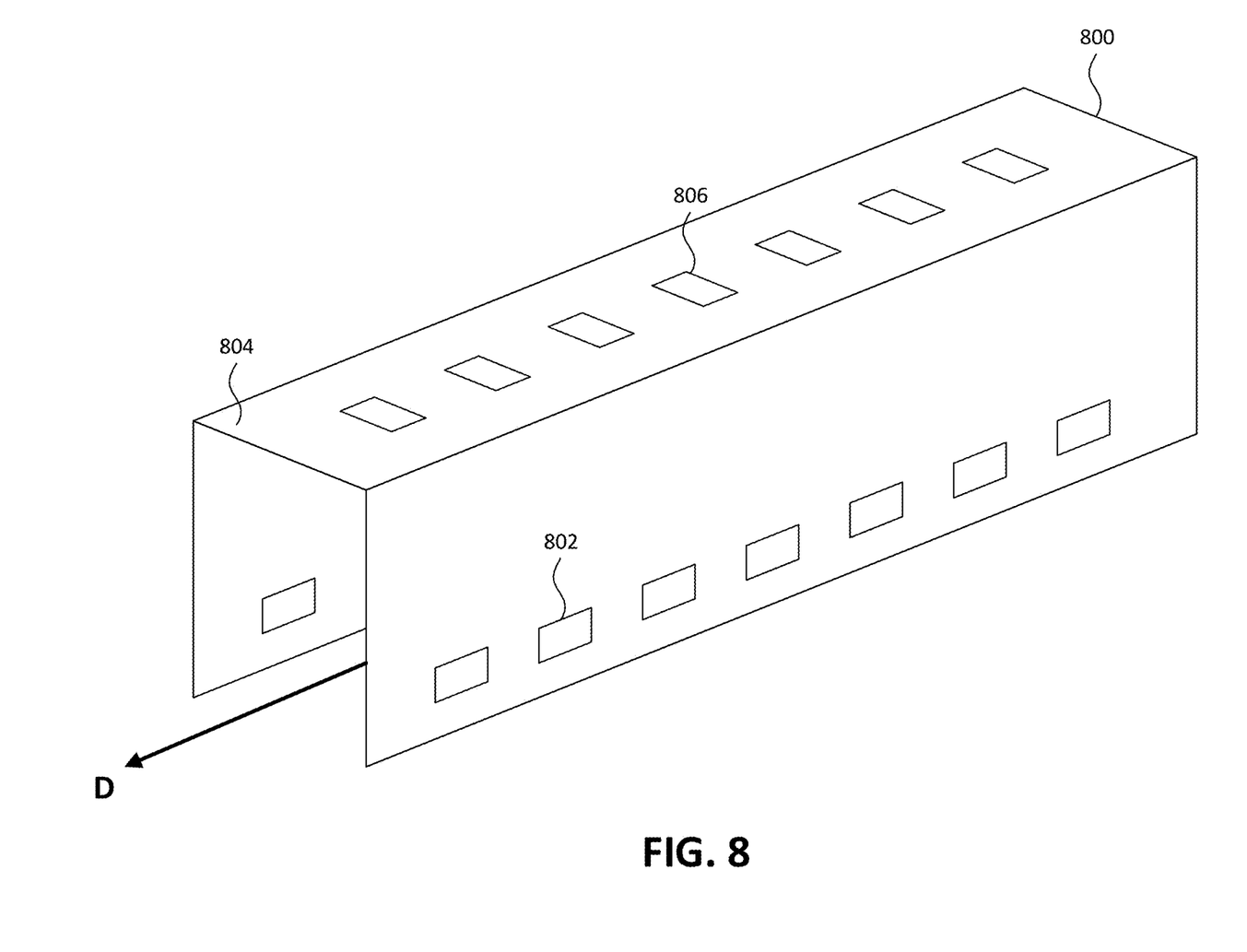
FIG. 8 is an isometric view of a portion of a reformer tunnel, according to an embodiment.

FIG. 8 is an isometric view of a portion of a reformer tunnel 800, according to an embodiment. Flue gas flows in the direction D. The reformer tunnel 800 includes a plurality of uniformly sized tunnel ports 802 formed on the side walls of the tunnel 800, as well as a plurality of tunnel ports 806 formed on the roof 804 of the tunnel 800.

Figure 9:
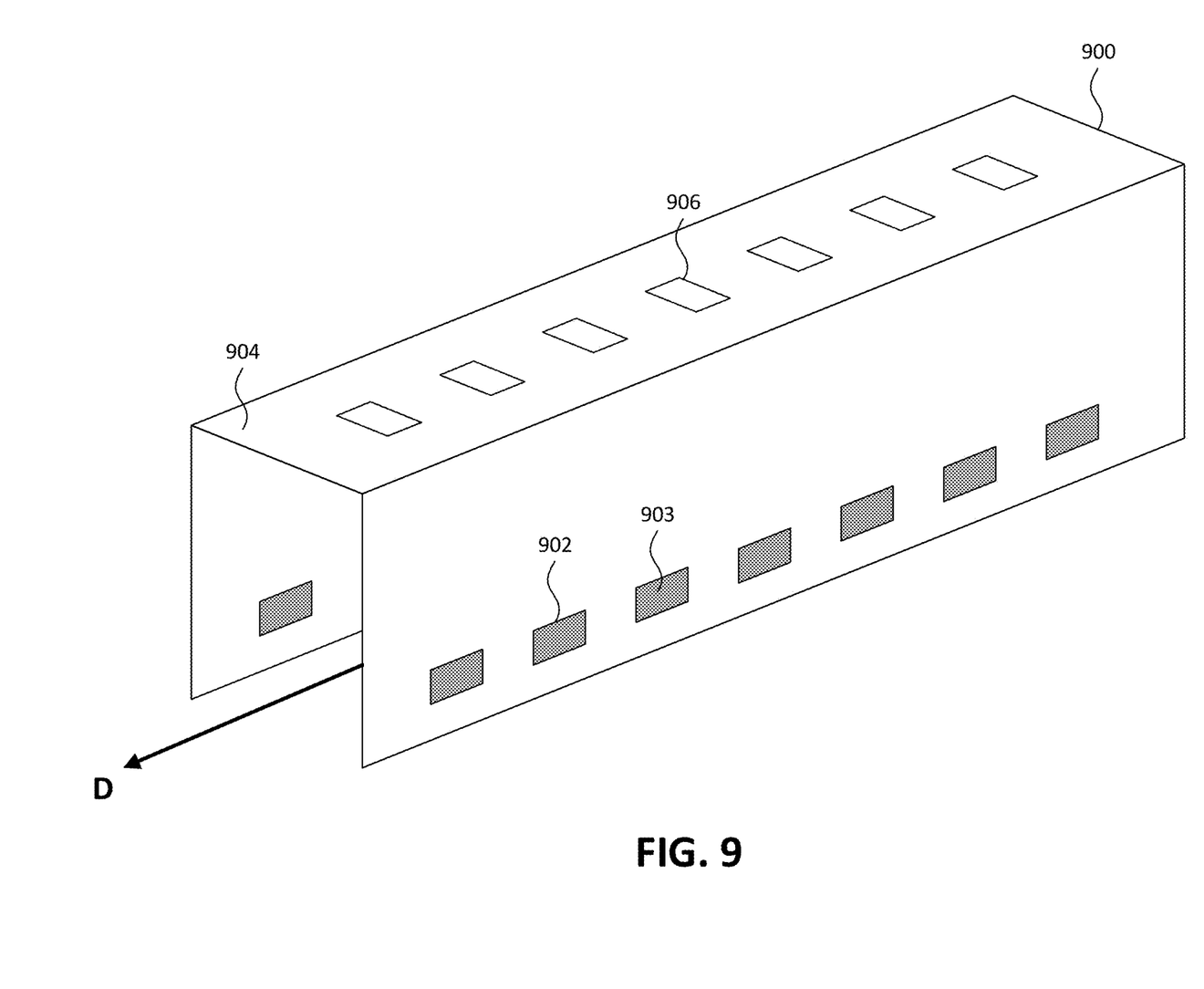
FIG. 9 is an isometric view of a portion of a reformer tunnel, according to an embodiment.

FIG. 9 is an isometric view of a portion of a reformer tunnel 900, according to an embodiment. Flue gas flows in the direction D. The reformer tunnel 900 includes a plurality of uniformly sized tunnel ports 902 formed on the side walls of the tunnel 900, as well as a plurality of tunnel ports 906 formed on the roof 904 of the tunnel 900. The tunnel ports 902 formed on the side walls of the tunnel 900 may include flow resistors 903 positioned at each tunnel port 902. Flow resistors may also be positioned in the tunnel ports 906 formed along the roof 904 of the tunnel 900.

Figure 10:
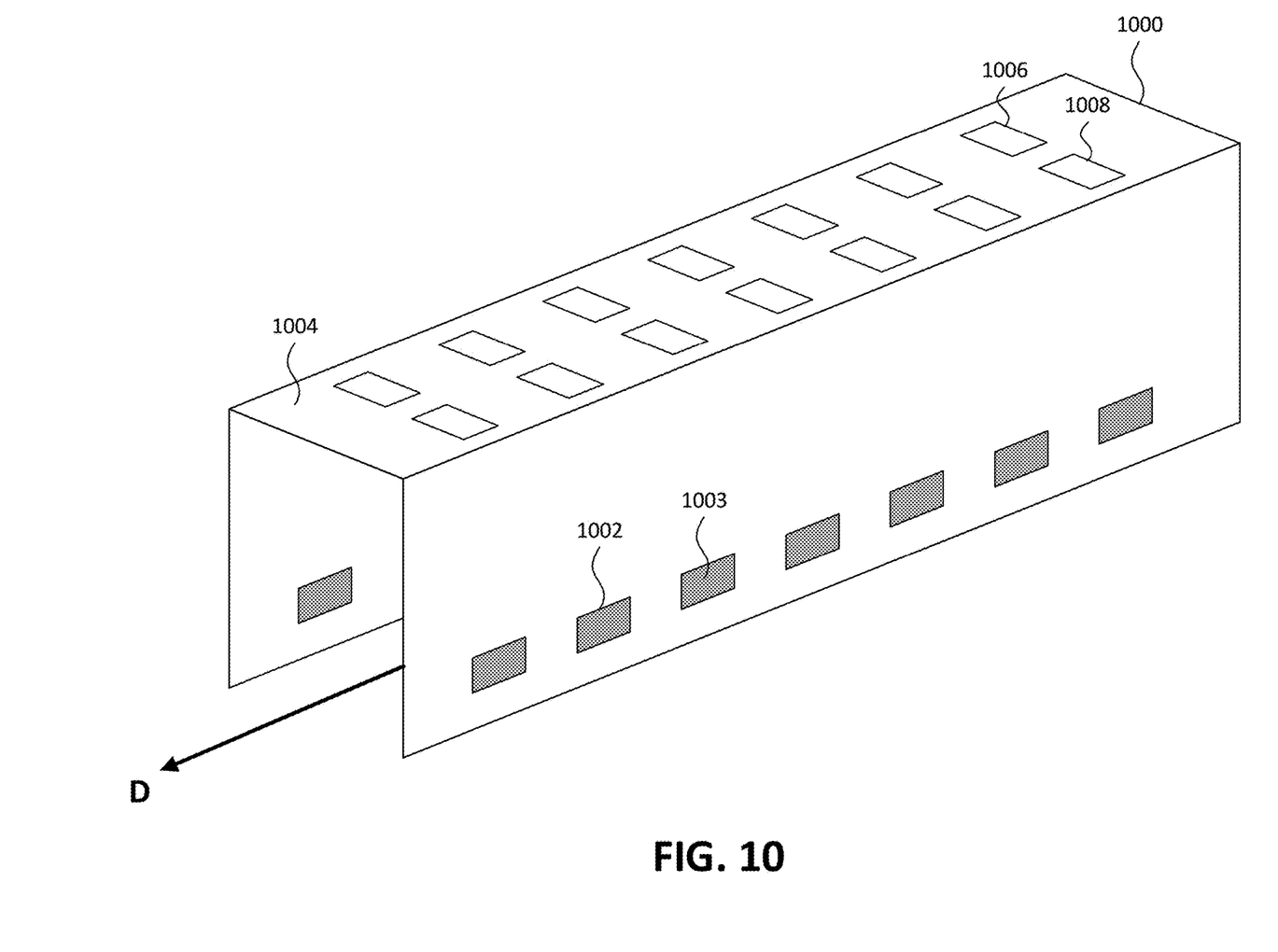
FIG. 10 is an isometric view of a portion of a reformer tunnel, according to an embodiment.

FIG. 10 is an isometric view of a portion of a reformer tunnel 1000, according to an embodiment. Flue gas flows in the direction D. The reformer tunnel 1000 includes a plurality of uniformly sized tunnel ports 1002 formed on the side walls of the tunnel 1000, as well as a first row of tunnel ports 1006 formed on the roof 1004 of the tunnel 1000 and a second row of tunnel ports 1008 formed on the roof 1004 of the tunnel 1000. The tunnel ports 1002 formed on the side walls of the tunnel 1000 may include flow resistors 1003 positioned at each tunnel port 1002.

Figure 11:
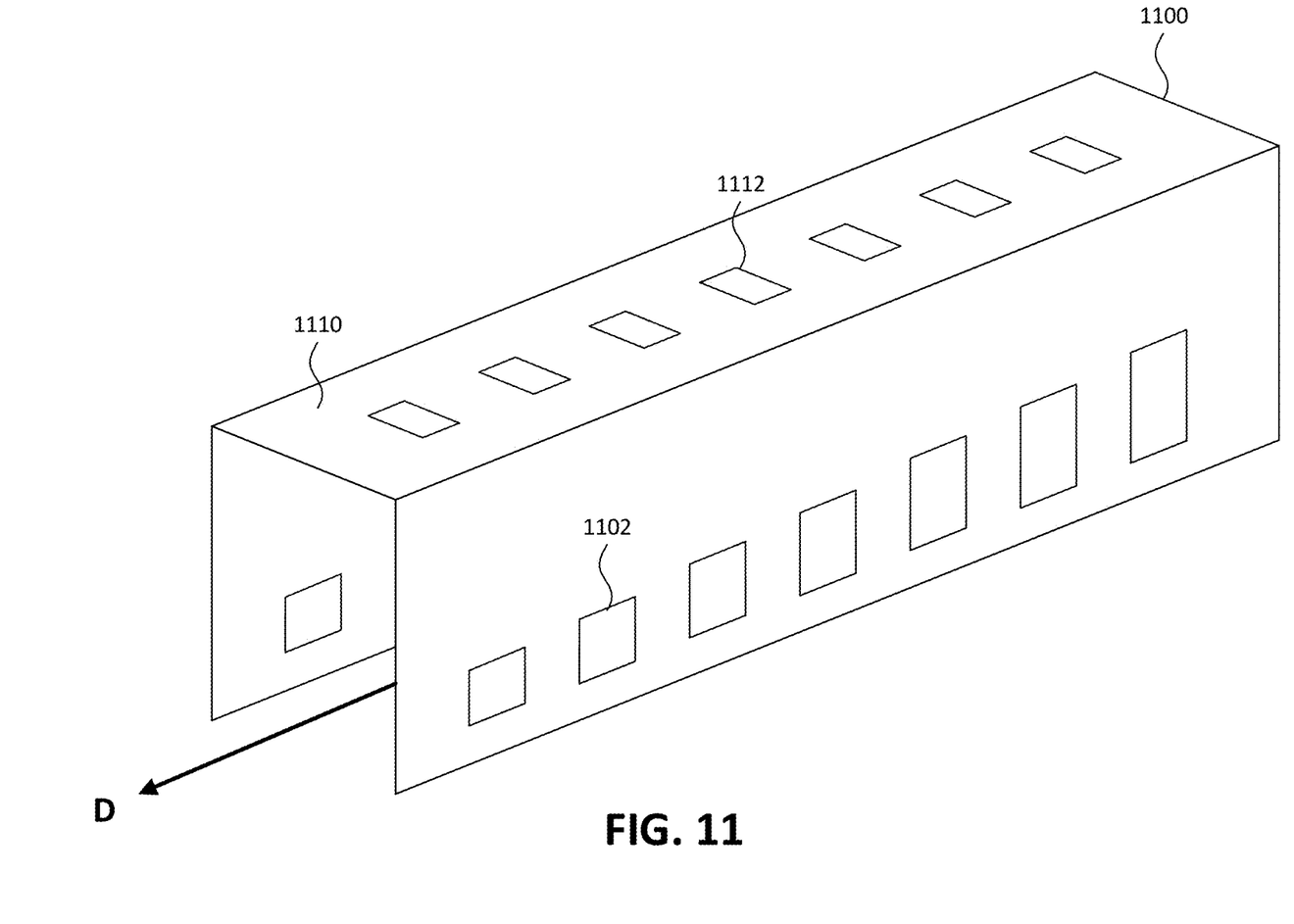
FIG. 11 is an isometric view of a reformer tunnel, according to an embodiment.

FIG. 11 is an isometric view of a reformer tunnel 1100, according to an embodiment. Flue gas flows in the direction D. The tunnel 1100 includes a plurality of tunnel ports 1102 which decrease in size from the closed end of the tunnel 1100 to the open end of the tunnel 1100. The tunnel 1100 includes a plurality of ports 1112 formed on the roof 1110 of the tunnel 1100. The arrangement of ports in the tunnel 1100 achieves a more uniform downward flue gas velocity along the entire length of the tunnel 1100.

Figure 12:
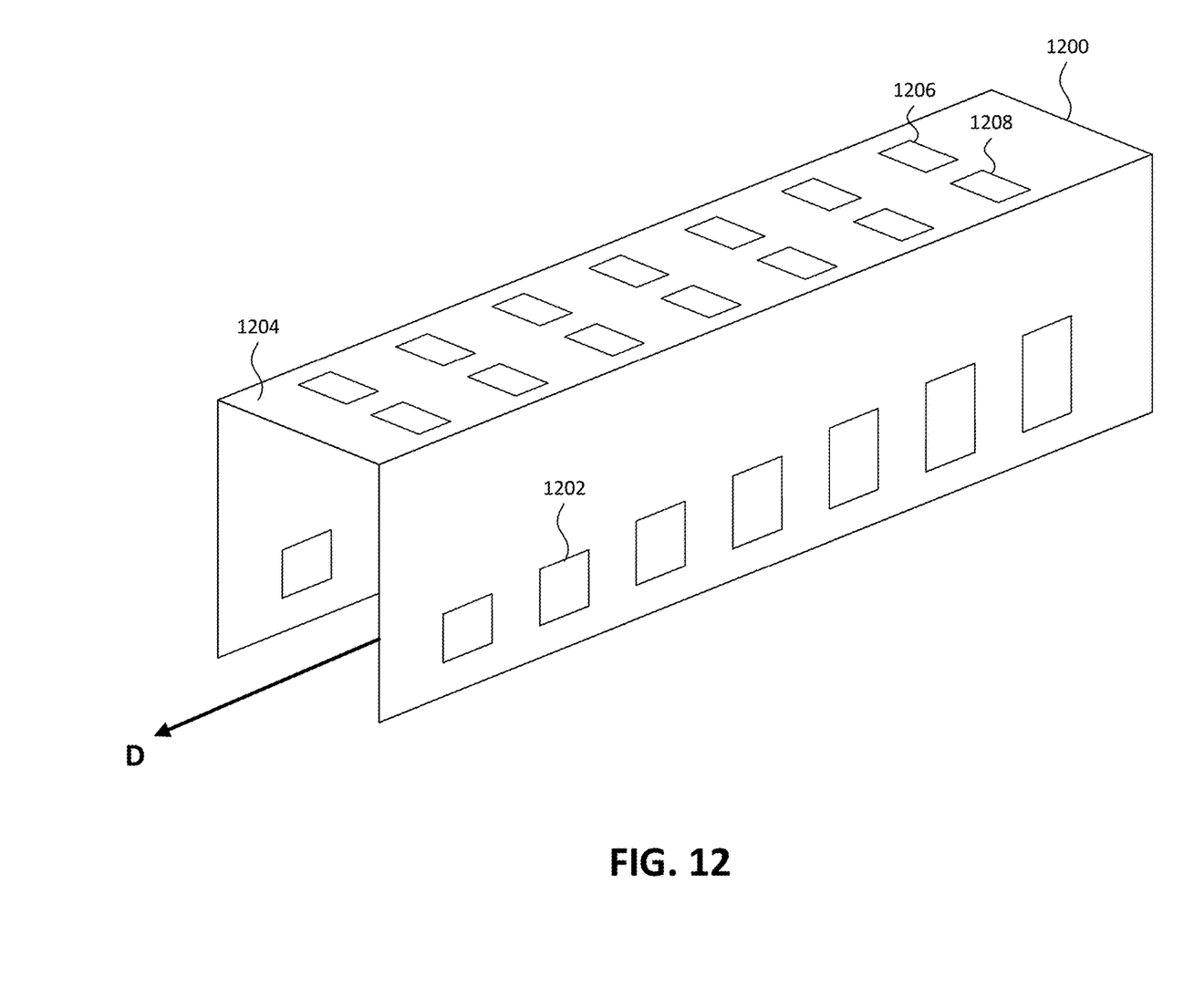
FIG. 12 is an isometric view of a portion of a reformer tunnel, according to an embodiment.

FIG. 12 is an isometric view of a portion of a reformer tunnel 1200, according to an embodiment. Flue gas flows in the direction D. The reformer tunnel 1200 includes a plurality of tunnel ports 1202 formed on the side walls of the tunnel 1200, as well as a first row of tunnel ports 1206 formed on the roof 1204 of the tunnel 1200 and a second row of tunnel ports 1208 formed on the roof 1204 of the tunnel 1202. The tunnel ports 1202 formed on the side walls of the tunnel 1200 vary in size, such that the tunnel ports 1202 gradually decrease in size the closer the ports are located toward the open end of the tunnel 1200.

Figure 13:
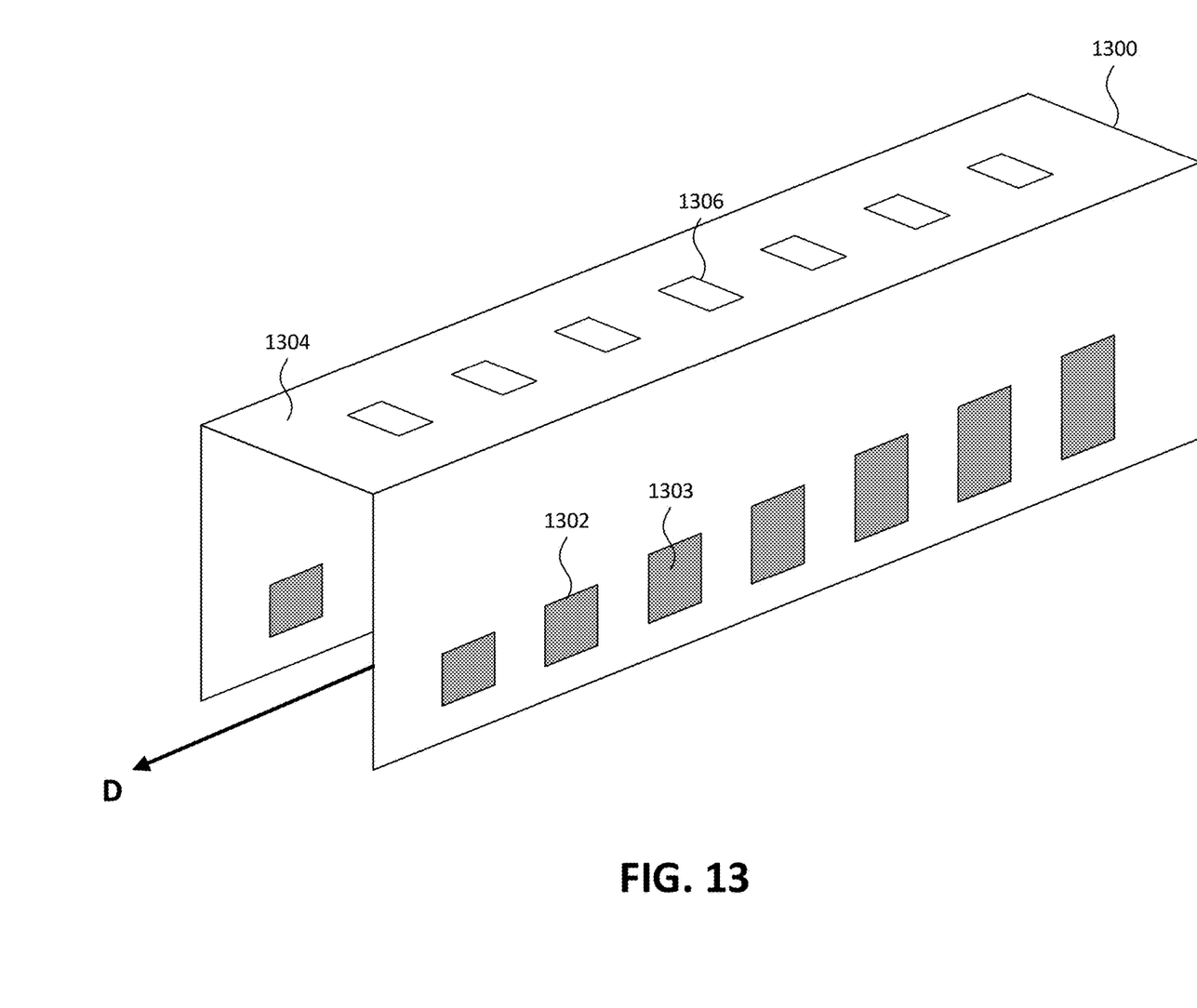
FIG. 13 is an isometric view of a portion of a reformer tunnel, according to an embodiment.

FIG. 13 is an isometric view of a portion of a reformer tunnel 1300, according to an embodiment. Flue gas flows in the direction D. The reformer tunnel 1300 includes a plurality of tunnel ports 1302 formed on the side walls of the tunnel 1300, as well as plurality of tunnel ports 1306 formed on the roof 1304 of the tunnel 1300. The tunnel ports 1302 formed on the side walls of the tunnel 1300 vary in size, such that the tunnel ports 1302 gradually decrease in size the closer the ports are located toward the open end of the tunnel 1302. The tunnel ports 1302 formed on the side walls of the tunnel 1300 may include flow resistors 1303 positioned at each tunnel port 1302.

The embodiments disclosed above are exemplary and not exclusive. Reformer tunnels with additional combinations of tunnel ports, tunnel port sizes, tunnel port locations, flow resistor positioning, etc., will be understood by those of skill in the art without departing from the scope of this disclosure.

The reformer tunnels disclosed herein can achieve uniform flue gas entering reformer tunnel, which leads to more uniformly heating the reformer tubes and catalysts and thereby prevents reformer tube overheating and premature failure. Such uniformity of tube and catalyst heating can result in an increase of $H_2$ production and efficiency of operation.

The reformer outlet temperature (ROT) can be raised such that the maximum observed tube temperature increases back up to the maximum allowable wall temperature (MAWT), thereby increasing hydrogen production and improving fuel efficiency of the furnace. The reformer process feed rate can be increased without changing the ROT, thereby increasing the maximum observed tube temperature back up to the MAWT.

The reformer throughput can be maintained at the lower maximum tube temperatures to prolong tube life. For example, a 36° F. drop in tube temperature can double the life of a reformer tube. Catalyst tubes are typically the most expensive equipment on the reformer island to replace/repair. Premature tube failures can lead to unplanned shutdowns with loss of sales or potentially incurring contractual penalties. Operators can take advantage of the higher efficiency by reducing burner fuel usage. Furthermore, higher average reaction temperatures along the tube length can allow decreasing the overall tube length, the catalyst volume, and therefore decreasing the reforming furnace size, that in turn lowers the capital cost for new plants.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A top-fired reformer box, comprising:
   a burner row;
   a tube row;
   a reformer tunnel including a closed end, an open end, and a plurality of tunnel ports formed along a side wall of the reformer tunnel, the plurality of tunnel ports located along the side of the tunnel and a first row of tunnel ports on a roof of the reformer tunnel wherein the plurality of tunnel ports gradually decrease in size from the closed end of the reformer tunnel to the open end of the reformer tunnel; and
   a flow resistor positioned in at least one tunnel port applying a flow resistance for flue gas entering the reformer tunnel via the at least one tunnel port such that uniform flow is achieved within the reformer tunnel.

2. The top-fired reformer box of claim 1, wherein the plurality of tunnel ports further includes a second tunnel port located in proximity to the closed end, and further comprising a flow resistor positioned in said first and second tunnel port applying a flow resistance for flue gas entering the reformer tunnel via the second tunnel port.

3. The top-fired reformer box of claim 2, wherein the flow resistor positioned at the second tunnel port applies a flow resistance less than the flow resistance applied by the flow resistor positioned at a first tunnel port.

4. The top-fired reformer box of claim 1, wherein a flow resistor is positioned at each of the plurality of tunnel ports, wherein the plurality of tunnel ports are uniform in shape and size.

5. The top-fired reformer box of claim 4, wherein the flow resistors positioned at each of the plurality of tunnel ports are configured such that a lower flow resistance is applied near the closed end of the reformer tunnel and a higher flow resistance is applied near the open end of the reformer tunnel.

6. The top-fired reformer box of claim 1, wherein the flow resistor comprises a perforated plate or a porous media.

7. The top-fired reformer box of claim 1, further comprising a second row of tunnel ports form on the roof of the reformer tunnel.

8. A top-fired reformer box, comprising:
   a burner row;
   a tube row; and
   a reformer tunnel including a closed end, an open end, a side wall and a roof,
      wherein a plurality of tunnel ports is formed along the side wall of the reformer tunnel, and
      wherein a plurality of tunnel ports is disposed in the roof of the reformer tunnel in at least a first row such that uniform flow is achieved within the reformer tunnel and where the plurality of tunnel ports gradually decrease in size from the closed end of the reformer tunnel to the open end of the reformer tunnel.

9. The top-fired reformer box of claim 8, wherein the plurality of tunnel ports formed along the side wall gradually decrease in size from the closed end of the reformer tunnel to the open end of the reformer tunnel.

10. The top-fired reformer box of claim 8, further comprising a second row of tunnel ports formed on the roof of the reformer tunnel.

11. The top-fired reformer box of claim 8, further comprising a flow resistor positioned at each of the plurality of tunnel ports formed disposed within the side wall of the tunnel.

12. The top-fired reformer box of claim 11, wherein the flow resistors positioned at each of the plurality of tunnel ports are configured such that a lower flow resistance is applied near the closed end of the reformer tunnel and a higher flow resistance is applied near the open end of the reformer tunnel.

13. The top-fired reformer box of claim 11, wherein the flow resistors comprise a perforated plate or a porous media.

14. The top-fired reformer box of claim 8, further comprising a flow resistor positioned at each of the plurality of tunnel ports formed along the roof of the tunnel.

* * * * *